United States Patent [19]

Natta et al.

[11] 3,957,743

[45] *May 18, 1976

[54] PROCESS FOR PRODUCING ELASTOMERS AND INTERMEDIATES FOR SYNTHETIC RUBBERS

[75] Inventors: Giulio Natta; Giorgio Mazzanti, both of Milan, Italy; Giorgio Boschi, Brussels, Belgium

[73] Assignee: Montecatini Edison S.p.A., Milan, Italy

[ * ] Notice: The portion of the term of this patent subsequent to Jan. 24, 1984, has been disclaimed.

[22] Filed: Feb. 28, 1974

[21] Appl. No.: 446,920

Related U.S. Application Data

[63] Continuation of Ser. No. 161,281, July 9, 1971, abandoned, which is a continuation of Ser. No. 626,367, March 22, 1967, abandoned, which is a continuation-in-part of Ser. No. 514,764, Nov. 8, 1965, abandoned, which is a continuation-in-part of Ser. No. 147,970, Oct. 26, 1961, abandoned, and a continuation-in-part of Ser. No. 629,085, Dec. 18, 1956, abandoned.

[52] U.S. Cl. ................................. 526/154; 526/348
[51] Int. Cl.² ................ C08F 210/00; C08F 212/00
[58] Field of Search ................................. 260/88.2

[56] References Cited
UNITED STATES PATENTS

| | | | |
|---|---|---|---|
| 2,692,257 | 10/1954 | Zletz | 260/88.1 |
| 2,692,258 | 10/1954 | Roebuck et al. | 260/88.1 |
| 2,692,259 | 10/1954 | Peters | 260/88.1 |
| 2,962,451 | 11/1960 | Schreyer | 252/429 |
| 3,051,690 | 8/1962 | Vandenberg | 260/88.2 |
| 3,058,963 | 10/1962 | Vandenberg | 260/88.2 |
| 3,178,400 | 4/1965 | Ragazzini | 260/88.2 |
| 3,300,459 | 1/1967 | Natta | 260/88.2 |
| 3,933,480 | 4/1960 | Gresham | 260/80.5 |

FOREIGN PATENTS OR APPLICATIONS

880,904   10/1961   United Kingdom

OTHER PUBLICATIONS

Gladding et al., Ind. Eng. Chem. Prod. Res. Develop. 1962, 1, 65–70.
Sartori et al., Rend. Accad. Naz. Lincoi, 1963, 35, 565.

*Primary Examiner*—Joseph L. Schofer
*Assistant Examiner*—A. L. Clingman

[57] ABSTRACT

A mixture of monomers essentially consisting of propylene and ethylene is polymerized in contact with a halogen-containing catalyst essentially free of microcrystalline precipitates, said catalyst resulting from mixing an alkyl aluminum compound with a hydrocarbon-soluble vanadium compound. The molar ratio of the propylene and ethylene in contact with the catalyst is maintained at a value such that an elastomeric, substantially amorphous, linear copolymerizate is produced, and is recovered from the reaction mass.

15 Claims, No Drawings

PROCESS FOR PRODUCING ELASTOMERS AND INTERMEDIATES FOR SYNTHETIC RUBBERS

This application is a continuation of our application Ser. No. 161,281 filed July 9, 1971 (now abandoned), which is a continuation of our application Ser. No. 626,367 filed Mar. 22, 1967 (now abandoned), which is a continuation-in-part of our application Ser. No. 514,764 filed Nov. 8, 1965 (now abandoned), which is a continuation-in-part of our application Ser. No. 147,970 filed Oct. 26, 1961 (now abandoned), and a continuation-in-part of our patent application Ser. No. 629,085 filed Dec. 18, 1956 (now abandoned).

This invention relates to a process for producing new high molecular weight copolymerizates of mono-olefins. More particularly, the invention relates to the copolymerization of olefins of the formula $CH_2 = CHR$ in which R is hydrogen or an alkyl radical, including the copolymerization of the higher alpha-olefins with each other, and the copolymerization of said higher alpha-olefins with ethylene. Still more particularly, the invention relates to a process for the copolymerization of propylene and ethylene, to copolymerizates consisting essentially of linear, amorphous, elastomeric copolymers free from homopolymers.

Our parent application Ser. No. 629,085 (now abandoned) shows that, under the critical conditions disclosed therein, there are obtained copolymerizates of ethylene and a higher alpha-olefin, e.g., propylene which are different from all previously known copolymerizates of ethylene and propylene in that they consist essentially of copolymers having the following combination of distinguishing characteristics:

a. the copolymers are amorphous at the X-rays;
b. they contain from 5 to 70% of ethylene by weight in the copolymer molecule;
c. they show, in the infra-red spectrum, absorption bands between 13.4 microns and 13.8; and
d. they have a molecular weight above 20,000 (as determined by viscosity measurements in tetralin at 135°C and calculated by the formula $[\eta] = 1.18 \times 10^{-3} \times M^{0.65}$, in which $[\eta]$ represents intrinsic viscosity and M represents molecular weight).

The copolymers and copolymerizates are further characterized in being linear, free of homopolymers, non-plastic, non-film-forming, and vulcanizable to excellent elastomers by means of certain agents which are used conventionally as aids in the vulcanization of rubber.

The copolymerizates consisting essentially of the linear amorphous, elastomeric copolymers were a marked advance in the art.

The high molecular weight copolymers of ethylene and propylene obtained by the methods disclosed prior to 1954 were plastic, film-forming products made up of macromolecules each of which was partially crystalline.

In 1954, Natta, Pino and Mazzanti copolymerized mixture of propylene and ethylene in contact with catalysts prepared from certain transition metal compounds and organometallic compounds. The product obtained was a mixture of the crystalline homopolymer, isotactic polypropylene, the amorphous homopolymer, atactic polypropylene, and some amorphous propylene-ethylene copolymer which was present in a fraction obtained by extracting the polymerizate with hot ether.

It proved to be impossible (as is recognized in the art) to separate the amorphous propylene-ethylene copolymer from the amorphous homopolymer, atactic polypropylene.

The showing that the copolymerizates consisting essentially of the linear, amorphous, elastomer and vulcanizable copolymers free from homopolymers could be obtained under the critical conditions shown in application Ser. No. 629,085 was the first known teaching of the possibility of obtaining a copolymerizate consisting essentially of the amorphous copolymers free from homopolymers from two monomers each of which yield a homopolymerizate that exhibits crystallinity at the X-rays when it is polymerized in contact with various "co-ordination" catalysts.

As shown in said application Ser. No. 629,085, the copolymerizates of ethylene and a higher alpha-olefin, e.g., propylene, consisting essentially of the amorphous copolymers free from homopolymers are obtained by copolymerizing a mixture of the higher alpha-olefin and ethylene in contact with a catalyst essentially free of microcrystalline precipitates and prepared by mixing a hydrocarbon solvent-soluble vanadium compound with an alkyl aluminum compound in which the alkyl groups each contain from 2 to 16 carbon atoms, while maintaining a molar ratio of propylene to ethylene in the liquid phase of at least 4:1, which corresponds under normal conditions (room temperature and atmospheric pressure) to a molar ratio in the gas phase of at least 1:1.

The present application is concerned more particularly with the process for the production of said copolymerizates in which the two critical conditions, i.e., the use of the catalyst prepared from the hydrocarbon-soluble vanadium compound, and the maintenance of the critical minimum propylene/ethylene molar ratio are observed.

Any of the hydrocarbon-soluble vanadium compounds can be used as one catalyst-forming component, including vanadium tetrahalides, vanadium oxyhalides, vanadium acetylacetonates, vanadyl halo-acetyl-acetonates having the formula $VOAc_2X$ or $VOAcX_2$ in which Ac represents the acetylacetonic residue and X is any halogen (Cl, Br, I or F), vanadyl alkoxides having the formula $VO(OR)_3$ and vanadyl halo-alkoxides having the formula $VO(OR)_2X$ or $VO(OR)X_2$ in which R is an alkyl radical containing from 1 to 8 carbon atoms, and X is any halogen.

Specific, typical hydrocarbon-soluble vanadium compounds that can be used as one catalyst-forming component include vanadium oxytrichloride, vanadium tetrachloride, vanadium triacetylacetonate, vanadyl diacetylacetonate, vanadyl monochloro-diacetylacetonate, triethyl-, triisopropyl-, triisobutyl-, or tri-hexyl-orthovanadates; mono-chloro-diethyl-di-isopropyl, di-isobutyl-, or di-hexyl-orthovanadates; dichloro-monoethyl-, monoisopropyl-, monoisobutyl, or mono-hexyl-orthovanadates; and the corresponding fluoro- and bromo-derivatives.

Specific alkyl aluminum compounds which can be used as the other catalyst-forming component include triethyl aluminum, trihexyl aluminum, tri-isobutyl aluminum, diethyl aluminum chloride, diethyl aluminum fluoride, di-isobutyl aluminum chloride, di-hexyl aluminum chloride, ethyl aluminum dichloride, isobutyl aluminum dichloride, hexylaluminum dichloride, etc.

It is essential that at least one of the catalyst components contains one or more halogen atoms.

The catalysts may be obtained by fractionation of catalysts prepared from metallo-organic compounds and transition metal compounds and comprising, initially, both solid microcrystalline portions and the amorphous portions, for example, by filtering a suspension of the unfractionated catalyst through a glass plate filter having pores of 5 to 15 microns diameter. The catalyst portions which pass through the pores form colloidal dispersions in the hydrocarbon used as the copolymerization medium and thus may be used to produce the pure or essentially pure copolymers of this invention.

The catalyst may be prepared directly by reacting the selected metallo-organic compound and the selected transition metal compound to obtan a reaction product which is soluble or readily dispersible in the hydrocarbon used as the copolymerisation medium.

Hydrocarbon solvents that can be used as the polymerization medium or diluent chemically inert to the catalyst and in which the selected vanadium compound is soluble include aliphatic hydrocarbons such as, e.g., n-heptane and iso-octane, and aromatic hydrocarbons such as, e.g., benzene and toluene. The diluent may also be one of the monomers to be copolymerized.

The copolymerization can be carried out at different temperatures ranging from below room temperature to 100°C.

When the catalyst is prepared from the alkyl aluminum compound and a hydrocarbon-soluble vanadium halogenated compound such as vanadium oxytrichloride or vanadium tetrachloride, the copolymerization is generally carried out at room temperature or, in any case at temperatures below 50°C, because the copolymerizates obtained with those catalysts at temperatures below 50°C, e.g., between room temperature and about 45°C, generally comprise only small amounts of oily, acetone-extractable fractions. Also, the molecular weight of the copolymers tends to decrease at copolymerization temperatures above 50°C. However, when the copolymerization is carried out continuously, somewhat higher temperatures up to 100°C, preferably up to 70°C, may be used.

The catalysts prepared by mixing the alkyl aluminum compound with a hydrocarbon-soluble vanadium compound in which at least one of the valences of the metal is satisfied by an organic group, such as an alkoxy group or acetylacetonic residue are also effective at the aforesaid temperatures. However, it has been observed that when the catalyst-forming components are an alkyl aluminum halide and certain of the hydrocarbon-soluble vanadium compounds in which at least one of the valences of the metal is satisfied by an organic group, the catalyst has an exceptionally high activity which remains practically constant, if the catalyst is prepared at a low temperature between 0°C and −80°C, preferably between −10°C and −50°C, and the copolymerization is carried out at temperatures between 0°C and −80°C, preferably between −10°C and −50°C, without exposing the catalyst to a temperature above 0°C, before it is brought into contact with the alpha-olefin/ethylene mixture to be copolymerized. The constant high activity of those catalytic systems prepared and used at temperature below 0°C makes it possible to obtain very high yields of polymerizate per weight unit of the catalyst used. Thus when using the catalysts prepared from an alkyl aluminum halide and a hydrocarbon-soluble vanadium compound of the type of vanadium triacetylacetonate, vanadyl diacetylacetonate, mono- and dihalo vanadyl-acetylacetonates and mono and dihalo alkyl orthovanadates, it is preferred to prepare the catalyst and effect the copolymerization at a temperature between 0°C and −80°C.

Table 1 below compares the copolymerization rates obtained using n-heptane as inert copolymerization solvent (referred to the same total concentration of monomers present in the dissolved phase) in the copolymerization of ethylene with propylene at 25°C and −20°C, respectively, in contact with catalysts prepared at the same temperature used for the copolymerization.

TABLE 1

Comparison between the average rate of ethylene-propylene copolymerization at the temperature of 25°C and −20°C, with catalyst $Al(C_2H_5)_2Cl/V(C_5H_7O_2)_3$ (triacetylacetonate) prepared and kept for various times at the copolymerization temperature.

Copolymerization conditions:
$C_3H_6/C_2H_4$ molar ratio in the feeding gaseous mixture = 4
pressure = 1 atm
0.007 mols of $Al(C_2H_5)_2Cl$
$Al(C_2H_5)_2Cl/V(C_5H_7O_2)_3 = 5$
Inert solvent : 350 cc of n-heptane

| Time elapsing between the preparation and the use of the catalyst (in minutes) | $\dfrac{g \text{ copolymer} \times \text{liter}}{g \text{ VAC}_3 \times h \times \text{mols of } (C_2H_4\text{-}C_3H_6)}$ | |
|---|---|---|
| | T = 25°C | T = −20°C |
| 1 | 41.3 | 91 |
| 5 | 24 | 85 |
| 15 | 10.9 | 81.5 |

The activity of the catalysts prepared at the low temperatures from an alkyl aluminum halide and a hydrocarbon-soluble vanadium compound in which at least one of the valences of the metal is satisfied by other than halogen tends to vary with the molar ratio between the alkyl aluminum halide and the vanadium compound. Such molar ratio may be comprised between 2 and 30, and is preferably between 4 and 20.

In order to obtain the propylene/ethylene copolymerizates consisting essentially of the linear, amorphous, high molecular weight copolymers free from homopolymers and containing from 5% to not more than about 70% by weight of ethylene in the copolymer molecule, it is necessary to maintain a given critical composition ratio in the monomer mixture during the copolymerization.

The molar ratio of the propylene to ethylene which is maintained in the reacting liquid phase is equal to or higher than 4, i.e. the propylene/ethylene molar ratio in the gas phase is at least 1:1.

Taking the foregoing into account, it is possible to vary the composition of the copolymerizate within a wide range by varying the molar ratio between the monomers present in the gas and liquid reacting phases.

The copolymerization can be carried out in various ways, and can be effected under normal atmospheric pressure, or under increased pressure.

The alkyl aluminum compound in a solvent can be combined with a solution of the vanadium compound, and the resulting mixture can then be contacted with the monomers. In a presently preferred embodiment, the catalyst is prepared in the presence of the monomers.

The copolymerization can be carried out continuously by continuously or periodically feeding additional amounts of the preformed catalyst, or of the catalyst-forming components in the predetermined ratio, to the system, while maintaining constant the ratio between the concentrations of the monomers in the liquid phase in which the copolymerization takes place.

This result can be obtained by feeding continuously to the system a mixture of the monomers having the critical constant composition.

When operating in the absence of the inert solvent, it is also possible to feed a mixture of ethylene in an excess of propylene continuously to the system while maintaining the pressure and temperature constant.

All measures or expedients which assist in maintaining the composition of the monomer mixture constant in the copolymerization reactor also favor the homogeniety of the copolymers obtained. In general, cuts obtained by extraction of the copolymerizates consisting essentially of the linear, amorphous copolymers free from homopolymers show that the copolymers are essentially homogeneous as to both molecular weight distribution and in the sense that the macromolecules are close to each other in composition.

By operating with a constant ratio under the conditions generically indicated above and as shown in detail in the following examples, it is possible to obtain amorphous copolymerizates of ethylene with propylene which, when fractionated by successive extractions with boiling liquids having increasing dissolving capacity, give fractions having essentially the same composition.

Thus, for instance, by carrying out the copolymerization of ethylene with propylene at a temperature of $-10°C$ in the absence of the inert solvent keeping the liquid propylene saturated with ethylene under a pressure of 3.3 atm and introducing into the reactor diethyl-aluminum monochloride and vanadium triacetylacetonate in such amounts as to have an $Al(C_2H_5)_2Cl/V(C_5H_7O_2)_3$ molar ratio of about 8, there is produced an amorphous copolymerizate having an ethylene content of 43.5% by mols.

This copolymer is almost completely extractable (over 95%) with boiling ether, which demonstrates clearly that the copolymerizate has both exceptional homogeniety of composition and a very narrow distribution of molecular weight.

Further evidence of the homogeneous composition of copolymerizates produced under conditions disclosed herein, evaluated from the solubility characteristics in organic solvents and from the restricted distribution of molecular weights, is found in working examples given hereinbelow.

That the linear, amorphous copolymers produced under the present critical conditions, using the catalysts based on hydrocarbon-soluble vanadium compounds, are true copolymers made up of macromolecules each of which contains units derived from the two monomers, and free of homopolymers is proved by X-ray and infra-red examination of the copolymers, and by extracting them with non-solvents for monopolymers of the starting monomers. For example, the propylene-ethylene copolymerizates were extracted with boiling solvents in a Kumagawa extractor using, successively acetone, ether and n-heptane.

Homopolymerizates obtained from pure ethylene are insoluble in acetone and ether, and only small portion (27%) is extractable with boiling n-heptane. As Natta et al, have shown, the homopolymerizate obtained by polymerizing pure propylene in contact with a catalyst prepared from, e.g., $VCl_4$ and an alkyl aluminum compound, also yields a residue after extraction thereof with boiling n-heptane.

In contrast, propylene-ethylene copolymerizates produced under the critical conditions described herein give no residue when extracted with boiling n-heptane, not even when a large proportion of the ethylene present in the mixture is converted. This demonstrates that the ethylene present in the monomer mixture has been copolymerized with the propylene to produce copolymerizates consisting, or consisting essentially of amorphous copolymers extractable with n-heptane, and free of homopolymers of either ethylene or propylene.

Further evidence that the copolymerizates produced according to the method of this invention consist of copolymers is obtained by X-ray examination of the copolymerizates, by a study of the infra-red spectra thereof, and by determination of the mechanical properties of the various fractions of the copolymerizates produced.

Study of the infra-red spectra of, for example, ethylene-propylene copolymerizates produced according to this invention, clearly shows for the lower molecular weight fractions of the copolymerizates which are extractable with acetone bands due to sequences of methylene groups, and the band of the methyl groups. The infra-red spectrum of the fractions of the copolymerizates which are extractable with ether shows some important differences from the spectrum of amorphous polypropylene. Thus, in the range 13.4 to 13.8 microns, bands due to the presence of sequences of methylene groups which are of a length different from the sequences of such groups in the polypropylene, can be clearly detected in the spectrum of the ether-extractable fractions of the copolymerizate.

More precisely, in the spectrum for the ether-extractable fractions of the copolymerizate, bands due to $-(CH_2)_n-$ groupings in which $n$ is between 2 and 6, and the band corresponding to $n$ is higher than 6, can be detected. The infra-red spectra between 9.5 and 15 microns for a linear polyethylene, for an amorphous polypropylene extractable with ether and for the ether-extractable fraction of the ethylene-propylene copolymerizate are reported in FIG. 9.

A comparison of the spectra shows clearly the presence of the copolymer spectrum of the above mentioned bands at 13.4 and 13.8 microns, and the absence of other characteristic bands, which are present in the homopolymers spectra.

Mechanical mixtures of the two homopolymers would obviously not show a spectrum similar to that of the copolymer.

Moreover, the percentage of propylene present in the ethylene-propylene copolymer can be determined on the basis of the infra-red spectrum by measuring the intensity of the band of the methyl group. More precisely, in the case of the ether-extractable fraction, the propylene content can be evaluated by measuring the intensity of the band at 7.25 microns in carbon tetrachloride solution, using an absorption factor obtained from measurements performed under comparable conditions on pure polypropylene. When the fractions of the ethylene-propylene copolymerizate which are obtained by extraction with ether are examined under the X-rays, they are always found to be amorphous, but the spectrum shows a maximum which is clearly shifted as compared to that of the pure amorphous polypropylene. The composition of the copolymer can be calculated on the basis of such shifting or displacement of the maximum shown in the spectrum.

The fractions obtainable by extracting the ethylene-propylene copolymerizate with n-heptane also show, at an X-ray examination, a spectrum which is different from the spectrum of the fractions obtained by extracting pure polypropylene with n-heptane. The X-ray diffraction spectrum for the heptane-extractable fraction of the copolymerizate shows in general that this fraction is completely amorphous.

The absence of crystalline polypropylene and the presence of an amorphous ethylene-propylene copolymer appears evident from FIG. 10. This figure shows the X-ray diffraction spectra of a sample of linear polyethylene, a sample of linear, partially crystalline polypropylene extractable with boiling n-heptane, and of a sample of an ethylene-propylene copolymer, extractable from the copolymerizate with n-heptane, and containing approximately 45% by weight of propylene.

The diffraction peaks characteristic for crystalline polyethylene and polypropylene are clearly absent in the copolymer spectrum, which is characteristic for an amorphous substance, and in which the diffraction maximum is shifted as compared to the maxima for amorphous polyethylene and polypropylene corresponding to the broken lines of the polyethylene and polypropylene diagrams.

In FIG. 11, the infra-red spectra in the 9.5 to 15 microns region are compared, for a linear polyethylene, a linear polypropylene insoluble in ether but extractable with boiling n-heptane, and for a fraction of an ethylene-propylene copolymerizate, extractable with n-heptane, and containing approximately 38% by weight of propylene.

The same remarks as for FIG. 9 can be made.

The percentages of ethylene and propylene in the heptane-extractable fractions of the copolymerizate can be determined from the infra-red spectrum of solid laminar specimens, measuring the intensity of the band at 8.60 microns. The absorption factor can be evaluated from measurements on copolymers, whose composition is established on the basis of radiochemical analysis.

The composition of the copolymers produced according to the invention can also be determined, in fact, and with particular accuracy, by labeling one of the monomers with $C^{14}$, measuring the specific activity of the copolymer by means of a Geiger counter as shown in Example 13 below.

All of the above tests and determinations prove that the copolymerizates of this invention are different in important respects from the homopolymers and from mixtures of copolymers and homopolymers. That is, these tests and determinations prove that the copolymerizates produced in accordance with this invention consist of, or consist essentially of the amorphous copolymers free from homopolymers.

The mechanical properties of the copolymerizates are also substantially different from those of mechanical mixtures of homopolymers having an empirical composition similar to that of the given copolymerizate, and serve to distinguish the new copolymerizates from such mixtures.

The accompanying drawings comprise diagrams which illustrate the results obtained by subjecting propylene-ethylene copolymerizates according to this invention to mechanical tests and, for comparison purposes, diagrams which illustrate, respectively, the results obtained by subjecting mixtures obtained by coprecipitating from a solution amorphous propylene and ethylene homopolymers to the same tests.

The mechanical tests were carried out according to ASTM-D-412-51-T on specimens prepared by die-molding at a temperature of 150°C, unless otherwise stated. The rate of separation of the grips was 25 mm/minute. The diagrams comprise curves illustrating the behaviour of the specimens during the first deformation cycle.

The curve shown in FIG. 3 was obtained by testing specimens die-molded at 185°C. The slope of such curve shows that the properties of the products contained in this fraction are very different from the properties of the copolymerizates produced in accordance with the present invention. This difference is to be attributed to the fact that the former are not homogeneous and contain in addition to homopolymers of the two olefins copolymers having a very high percentage of one of the two monomeric units. The curve shows a high initial modulus and a well-defined yield point similar to the initial modulus and yield point shown in FIGS. 1 and 2. The reversible elastic elongation of the stretched specimens (FIG. 3) is of the same order as that of the factions obtained by extracting polypropylene (homopolymer) with n-heptane and is remarkably lower than the reversible elastic elongation of the stretched specimens of the heptane-extract extract of the copolymerizates according to the present invention. This is evident by comparison of FIG. 3 with FIGS. 4–7.

The copolymerizates of this invention, which are free or essentially free of homopolymers, are particularly useful for all purposes for which an amorphous linear product of high molecular weight and low second order transition temperature is required. The crude copolymerizates are practically completely amorphous and can be used directly as obtained without having to be subjected to troublesome and time-consuming fractionation.

The copolymerizates produced under the present conditions, while maintaining a propylene/ethylene molar ratio of at least 1:1 in the gas phase, are elastomeric and suitable for various important uses in the field of synthetic rubbers. The copolymerizates consisting essentially of the copolymers having a narrow distribution of molecular weights have particular advantages as regards the workability and mechanical properties of vulcanizates obtained from them.

The copolymerizates obtained using the catalysts prepared from the different hydrocarbon-soluble vanadium compounds and alkyl aluminum compounds and maintaining the critical minimum molar ratio of propylene to ethylene in the gas phase are the same in that they consist essentially of the linear, amorphous, high molecular weight copolymers free from homopolymers and having the properties of a non-vulcanized elastomer.

The molecular weight of the copolymerizates can be regulated by the known methods for regulating the molecular weight of polymers produced by coordinated anionic polymerization processes.

For instance, the copolymerization can be effected in the presence of specific organometallic compounds which tend to curtail the degree of polymerization, such as, e.g., zinc alkyls, or by introducing small amounts of gaseous hydrogen into the copolymerizing system.

It is surprising that high yields of the copolymerizates can be obtained by copolymerizing mixtures of ethylene with propylene at a temperature below 0°C in contact with the catalysts prepared at temperatures below 0°C from the hydrocarbon-soluble vanadium compounds of the type of vanadium and vanadyl-acetylacetonates, vanadyl-halo-acetylacetonates and haloalkoxides and an alkyl aluminum halide.

In fact, it had been observed previously that, in general, polymerization rates and polymer yields tended to increase with increasing temperatures, other conditions being the same. It is postulated that the catalysts obtained by mixing the vanadium compounds of the type of the vanadium and vandyl acetylacetonates, vanadyl-halogen-acetylacetonates and halo-alkoxides with the alkyl aluminum halides, at temperatures below 0°C, preferably between −10°C and −50°C are specifically new complexes which have very high catalytic activity at temperatures below 0°C.

As shown in Table 1, very high yields of copolymerizate can be obtained if the copolymerization with said catalysts prepared at the temperatures below 0°C is carried out at below 0°C in the absence of an extraneous solvent chemically inert to the catalyst and using the monomers in the liquid state, i.e., using a solution of ethylene in the higher alpha-olefin to be copolymerized, kept in the liquid state.

The following examples are given to illustrate the invention and are not limiting.

EXAMPLE 1

A solution of 0.025 moles trihexyl aluminum in 300 cc n-heptane is introduced under nitrogen into a 2080 cc autoclave. 185 g of a propylene-propane mixture containing 88.5 propylene, and 12 g ethylene are then added. Thus, the mole ratio of propylene to ethylene is 9.05:1. The mixture is heated under agitation up to 45°C and at this temperature a solution of 0.008 moles VOCl$_3$ in 50 cc heptane is injected into the autoclave. After a few minutes a spontaneous temperature increase from 45° to 65°C is noticed while the pressure drops from 28 to 23 atm. 150 cc methanol are then injected into the autoclave, to decompose the catalyst and stop the reaction. The polymerization product is discharged and purified by treatment with solvents acidified with hydrochloric acid, and subsequent complete coagulation with methanol. 43 g of product are thus obtained, with a conversion corresponding to 24.4% of the monomers employed. The copolymerizate obtained is then fractionated by extraction with hot solvents.

The acetone extract corresponds to 14% of the total product and consists of low molecular weight copolymers of oily appearance. In the infra-red spectrum of this fraction both the band due to the methyl groups and the bands due to sequences of methylene groups are very clearly visible.

The ether extract corresponds to 66.4% and consists of a solid product having the appearance of a non-vulcanized elastomer. This fraction shows an intrinsic viscosity of 0.89 (corresponding to a molecular weight of about 27,000) and appears amorphous at an X-ray examination, with a maximum of the amorphous spectrum which is decidedly shifted as compared to that of amorphous polypropylene. This fraction was also submitted to an infra-red examination. From the infra-red spectrum it is determined that sequences of methylene groups yielding bands between 13.4 and 13.8 microns are present, and it is possible to calculate a propylene content of about 85% by weight.

The heptane extract, corresponding to 19.6% of the total, is a solid of intrinsic viscosity 2.44. The X-ray spectrum does not indicate any crystallinity but shows a maximum of the amorphous which is decidedly shifted with respect to that of the amorphous propylene polymers. From the infra-red spectrum of this fraction a propylene content of 48% can be calculated. No residue was found after the extraction with heptane. This proves that in this method making the copolymerizate, no pure ethylene polymer was formed.

EXAMPLE 2

A solution of 0.02 moles trihexyl aluminum in 300 cc heptane, and 210 g of a propylene-propane mixture containing 88.5% propylene, and 40 g ethylene are introduced under nitrogen into an autoclave of 2,000 cc capacity. The initial propylene/ethylene mol ratio is therefore 3.1:1. The autoclave is heated to 45°C and at this temperature a solution of 0.008 moles VOCl$_3$ in 50 cc heptane is added. A rapid temperature increase of about 20° occurs, while a rapid pressure decrease is noted. 200 cc methanol are added to stop the reaction and the polymerization product is removed from the reactor. After purification and drying, it amounts to 74 g. A sample is mixed with an inert carrier and fractionated by extraction with hot solvents.

An examination by infra-red spectrography shows that the acetone extract (18% of the treated product) consists of ethylene-propylene copolymers.

The ether extract (37.3%) consists of a solid product which in appearance is similar to a non-vulcanized elastomer. At an X-ray examination, this fraction is found to be completely amorphous and yields a spectrum having the maximum decidedly shifted with respect to that of the amorphous polypropylene. From this displacement a propylene content of 43% is calculated. The infra-red spectrum shows that sequences of methylene groups are present, and from the intensity of the band of methyl groups a propylene content of 45% is calculated. This fraction has, in tetralin solutions at 135°C, an intrinsic viscosity of 0.78, corresponding to a molecular weight of about 22,000.

The heptane extract (44.7%) has an intrinsic viscosity of 2.55. This fraction appears almost completely amorphous at an X-ray examination and from the position of the maximum of the amorphous a propylene content of about 20% by weight is calculated. On the basis of an infra-red spectrum examination, a propylene content of 22% by weight is calculated.

No residue is found after the extraction with heptane.

It can be concluded, therefore, that the products obtained consist of ethylene-propylene copolymers and are free from homopolymers of either monomer, i.e., from both polyethylene and polypropylene.

EXAMPLE 3

A solution of 0.02 moles trihexyl aluminum in 300 cc heptane, 169 g of a propylene propane mixture containing 152 g of propylene, and 34 g ethylene are introduced into an autoclave of about 2,000 cc capacity, from which the air has been previously removed. The initial mol ratio of propylene to ethylene is therefore 3:1.

The mixture is heated, while agitating to 90°C and at this temperature a solution of 0.008 moles $VOCl_3$ in 60 cc heptane is injected into the autoclave. The temperature rises spontaneously in a few minutes up to 115°C, while the pressure drops from 40 to 25 atm. A few minutes after addition of the $VOCl_3$, 150 cc methanol are introduced into the autoclave, to decompose the catalyst and stop the reaction. The residual gases are then vented, 85 Nl containing 75.9% of propylene and 5.1% of ethylene being collected.

From the amount of monomers that has disappeared it is found that 0.75 moles propylene and 1 mole ethylene, corresponding to 59.5 g have reacted. The product obtained is purified as in the foregoing examples and 58 g of white solid product of rubbery appearance are isolated. This product is then fractionated by extraction with hot solvents.

The acetone extract corresponds to 26% and consists of ethylene-propylene copolymers the propylene content of which is, on the basis of the infra-red spectrum, 85% by weight.

The ether extract corresponds to 60.5% and consists of a solid of rubbery appearance which appears amorphous at an X-ray examination and shows a maximum in the diffracted intensity which markedly shifted with respect to that of amorphous polypropylene (homopolymer). On the basis of this displacement a propylene content of about 45% is calculated. From the infra-red spectrum a propylene content of 35% is calculated. The fraction extracted with ether shows a density of 0.852 and, in tetralin solution at 135°C, an intrinsic viscosity of 0.62, corresponding to a molecular weight of about 13,000.

The heptane extract (13.4%) has an intrinsic viscosity of 2.70, corresponding to a molecular weight of about 150,000. At an X-ray examination this fraction is found to be amorphous to the extent of about 90%. A slight crystallinity (about 10%) is indicated by the presence of maxima which appear however shifted with respect to those of the pure polyethylene. From the infra-red spectrum of the copolymer extractable with heptane, a propylene content of 17% can be calculated.

EXAMPLE 4

A solution of 5.65 g (equal to 0.02 moles) trihexyl aluminum in 350 cc heptane is introduced under nitrogen into a shaking autoclave of about 2,000 cc capacity. 29 g of propylene and 9 g of ethylene (propylene/ethylene mol ratio 2.16:1) are added and the autoclave is heated, while keeping it in agitation, up to a temperature of 45°C. At this temperature, a solution of 1.39 g (0.008 moles) $VOCl_3$ in 50 cc heptane is injected into the autoclave. Within 5 minutes a spontaneous temperature increase of about 5°C can be noted while the pressure drops from 5 to 2 atm. 53 g of a propylene-ethylene mixture, containing the two monomers in a mol ratio of propylene to ethylene equal to 2:1, are then introduced into the autoclave.

The pressure rises to 16 atm. Ten minutes after this addition, the temperature in the autoclave has reached 61°C, while the pressure has dropped from 16 to 7 atm. Two further additions of monomers are made within one hour from the start of the experiment, so as to introduce a total of 157 g propylene and 49 g ethylene, corresponding to a mol ratio between the monomers equal to 2.19. Thereafter, methanol is pumped into the autoclave to decompose the catalyst and stop the reaction. The product obtained is discharged and purified from the inorganic products present by treatment with solvents acidified with hydrochloric acid, followed by a complete coagulation with an excess of methanol. 95.3 g of copolymers, corresponding to a conversion of 46.3% based on the total amount of monomers introduced into the autoclave, are thus obtained. A sample of the product obtained is ground, throughly mixed with an inert supporting material consisting, for instance of small Raschig rings, and fractionated by extraction with hot solvents in a Kumagawa extractor.

The acetone extract corresponds to 10.8% of the total product obtained, and an examination of the infra-red spectrum of this fraction shows that it consists of a copolymer containing 71% by weight of propylene. Further, bands due to sequences of methylene groups are clearly visible.

The ether extract (43.3%) consists of a solid product similar in appearance to a non-vulcanized elastomer, has a density of 0.855, and shows in its X-ray spectrum a maximum of the amorphous which is decidedly shifted with respect to that of the pure amorphous polypropylene. This fraction has, in tetralin solutions at 135°C, an intrinsic viscosity of 1.26, corresponding to a molecular weight of about 45,500. The infra-red spectrum of this fraction shows that sequences of methylene groups are present, and indicates a propylene content of 80%.

The heptane extract corresponds to 42% and shows an intrinsic viscosity of 3.0 corresponding to a molecular weight of about 170,000. An X-ray examination reveals the presence in this fraction of an amorphous ethylene-propylene copolymer as well as of a slight crystallinity (under 10%) as indicated from maxima in the spectrum, which are however in slightly shifted positions with respect to those of the pure linear polyethylene. This crystallinity can be attributed to the presence, in this fraction, of a small number of molecules containing such a high percentage of ethylene as to allow the existence of long sequences of methylene groups. On the basis of an examination by infra-red spectrography a propylene content of 15% is calculated. Specimens obtained by molding the heptane extract at 120°C yielded the stress-elongation diagram shown in FIG. 4.

The residue of said extractions corresponds to 3.9% and consists of a crystalline product rich in polyethylene.

EXAMPLE 5

A solution of 0.025 moles trihexyl aluminum in 310 cc heptane, 102 g of a propylene-propane mixture containing 88.5% propylene, and 15 g ethylene are introduced under nitrogen into an autoclave of 2.080 cc capacity. The mol ratio of the propylene to the ethylene present initially is, therefore, 3.98:1. The autoclave is heated to 65°C, then a solution of 0.008 moles $VOCl_3$ in 50 cc heptane is added. In the course of a few minutes the temperature rises to 80°C while the pressure drops from 22 to 16 atm. Methanol is pumped into the autoclave and the process is continued in the usual manner, obtaining 38.5 g of a solid product, which is fractionated as described in the previous examples.

The acetone extract corresponds to 18.3% and consists of oily low molecular weight products. In the infra-red spectrum of this fraction, both the band due to the methyl groups and the bands due to sequences of methylene groups are clearly visible.

The ether extract corresponds to 60% and consists of a solid product of rubbery appearance, having an intrinsic viscosity of 0.82, corresponding to a molecular weight of about 24,000. An X-ray examination shows that this fraction consists of an ethylene-propylene copolymer containing about 69% by weight of propylene. From the infra-red spectrum a propylene content of 70% can be calculated.

The heptane extract corresponds to 24.6% and has an intrinsic viscosity of 2.60, corresponding to a molecular weight of about 140,000. An X-ray examination reveals a crystallinity of about 15%, due to macromolecules having a high ethylene content and the presence of an amorphous ethylene-propylene copolymer with a propylene content of 26%.

No residue remains after the heptane extraction. This demonstrates that no pure polyethylene or crystalline polypropylene were formed.

EXAMPLE 6

A solution of 0.02 moles trihexyl aluminum in 150 cc heptane is introduced under nitrogen into a glass flask of 250 cc capacity, provided with a mechanical stirrer, a refluxing condenser and a dropping funnel. While keeping this solution in agitation at a temperature of 85°C, a solution of 0.008 moles $VOCl_3$ in 20 cc heptane is added to it dropwise in the course of ten minutes. After the addition of the $VOCl_3$ is completed, the mixture is kept in agitation for a further 10 minutes, then it is injected into a shaking autoclave of 2,000 capacity, kept at 50°C and previously charged with 250 cc heptane, 139 g of a propylene-propane mixture containing 126 g propylene and 39 g ethylene. The initial mol ratio of propylene to ethylene is therefore 2.14:1.

As soon as the $VOCl_3$ is introduced, the temperature rises rapidly from 50°C to 80°C while a rapid pressure decrease can be noted. After a few minutes, 200 cc methanol are injected into the autoclave to stop the reaction.

By proceeding as described in the foregoing examples, 39 g of product, corresponding to a conversion of 23.6% based on the monomers employed, are isolated. By extraction with hot solvents, the following fractions are obtained:

An acetone extract, corresponding to 5% of the product obtained and consisting of oily low molecular weight copolymers.

An ether extract, corresponding to 13.8% and consisting of a solid similar in appearance to a non-vulcanized elastomer, with a density of 0.857 and an intrinsic viscosity of 1.05, corresponding to a molecular weight of 35,000. This fraction appears amorphous at an X-ray examination and from the position of the maximum of the amorphous it is evident that it consists of an ethylene-propylene copolymer having a propylene content of about 35% by weight. From the infra-red spectrum a propylene content of 40% is calculated.

The heptane extract, corresponding to 80% of the product obtained consists of a solid of density 0.89 and intrinsic viscosity (in tetralin solution at 135°C) of 5.7, corresponding to a molecular weight of about 460,000. At an X-ray examination this fraction is found to be composed of about 85% of an amorphous copolymer, and of a certain crystalline phase having a lattice cell which is strained if compared with that of pure polyethylene. This crystalline fraction is to be ascribed to the presence of a copolymer particularly rich in ethylene. From an examination of the infra-red spectrum of this fraction a propylene content of 18% is calculated. FIG. 5 shows the stress-elongation curve as determined on specimens of this fraction, prepared according to the ASTM test D-412-51T.

The residue of said extractions corresponds to 2.2% and consists of a crystalline product still richer in ethylene.

EXAMPLE 7

The monomer mixture which is used in the copolymerization is prepared by introducing 104 g of a mixture of propylene and propane containing 88.5% propylene, and 15 g ethylene into a shaking autoclave of 1100 cc capacity. The autoclave is then heated under shaking up to 180°C, so that a gaseous mixture is obtained containing the two monomers in a molar ratio propylene:ethylene = 4.1:1.

This autoclave is then connected with a second autoclave of 2080 cc capacity, which was previously charged with a solution of 0.02 moles trihexyl aluminum in 350 cc heptane. While keeping this second autoclave in motion, at room temperature, the gaseous mixture of the two monomers is pumped in up to a pressure of 3.5 atm.

A solution of 0.002 moles of $VOCl_3$ in 50 cc heptane is then injected into the polymerization autoclave, and the autoclave is kept in motion, while introducing continuously the mixture of the two monomers, reaching in about 5 min., a pressure of 10 atm. 200 cc methanol are then introduced into the autoclave in order to stop the reaction.

From the reservoir autoclave 17 g of the mixture are recovered.

After purification and drying, 19.5 g of products are obtained corresponding to a conversion of 21.5% of the monomers introduced into the polymerization autoclave. The product is fractionated by solvent extraction in a Kumagawa extractor, after mixing it with an inert material.

The acetone extract, corresponding to 7.1% of the total product, consists of a copolymer of low molecular weight. The infra-red spectrum of this fraction clearly shows bands attributable to sequences of methylene groups and the band of the methyl group.

The ether extract, corresponding to 39.5% of the total, consists of a solid product, similar in appearance to a non-vulcanized elastomer, and having an intrinsic viscosity of 1.60, corresponding to a molecular weight of about 66,000. This fraction appears completely amorphous under the X-rays, and the maximum of the amorphous polymer spectrum is clearly shifted in respect to the maximum of the pure amorphous polypropylene.

Fro this shift one can calculate a propylene content of approximately 50% by weight.

The infra-red spectra clearly show the presence of bands between 13.4 and 13.8 $\mu$. From the intensity of the band due to the methyl groups, a propylene content of 60% by weight is calculated.

The heptane extract, corresponding to 53.5% of the total, has an intrinsic viscosity of 4.05, corresponding to a molecular weight of approximately 274,000.

FIG. 6 gives a stress-elongation graph obtained with specimens prepared from this fraction according to the ASTM test mentioned above. This fraction appears completely amorphous under the X-rays and the position of the maximum of the amorphous spectrum indicates a propylene of about 40%.

From the infra-red spectrum this fraction can be said to be an ethylene-propylene copolymer, having a propylene content of 31%.

EXAMPLE 8

179 g of a propylene-propane mixture containing 88.5% propylene, and 14 g ethylene, are introduced in a shaking autoclave of 1100 cc capacity which is used as a reservoir. The molar ratio between propylene and ethylene is 7.52:1. The reservoir autoclave is heated under shaking up to 200°C. The polymerization apparatus proper is a 2080 cc autoclave, the head of which is fitted with two cocks, one of which is connected to a tube reaching the bottom of the autoclave and through which gas can be bubbled in. A solution of 0.02 moles trihexyl aluminum in 450 cc heptane is introduced in the previously evacuated polymerization autoclave. The gaseous mixture of the two monomers is then introduced from the reservoir into the polymerization autoclave, up to a pressure of 2 atm. Thereafter a solution of 0.002 moles $VOCl_3$ in 50 cc heptane is injected under stirring. The polymerization autoclave is then set in vertical position and the monomers are fed in continuously through the cock connected to the bubbler, while the excess gas is vented continuously, keeping a constant pressure of 5.5 atm. After about 5 minutes 57 liters of gas are collected from the autoclave, the feeding is stopped and methanol is pumped into the polymerization autoclave.

The temperature is kept for the entire duration of the run at 25°C. The product is purified by treatment with hydrochloric acid and then completely coagulated with methanol. After a further washing with methanol and drying under vacuum in the heat, 15.5 g of a solid product similar in appearance to a non-vulcanized elastomer are isolated. Fractionation is carried out by extraction with hot solvents.

The acetone extract, corresponding to 3.7% of the polymer obtained consists of low molecular weight oily product. The infra-red spectrum of this fraction shows bands attributable to sequences of methylene groups, and the bands of the methyl groups.

The ether extract, corresponding to 65.5%, consists of a solid product similar in appearance to a rubber, with an intrinsic viscosity of 2.45, corresponding to a molecular weight of about 126,000. The infra-red spectrum of this ether-extractable fraction shows the bands corresponding to sequences of methylene groups. From the intensity of the band due to the methyl groups, a propylene content of approximately 55% is calculated. The X-ray examination confirms that this fraction consists of an amorphous copolymer having a propylene content of about 53%.

The heptane extract corresponds to 30.8% and consists of a solid product with an intrinsic viscosity of 4.28, i.e., a molecular weight of about 300,000. From the infra-red spectrum a propylene content of 36% is calculated. From the X-ray spectrum this fraction appears as an amorphous copolymer containing 33% propylene. The extraction with heptane leaves no residue.

The products obtained in this example are clearly ethylene-propylene copolymers, free from macromolecules prevailingly formed of a polymer of a single olefin.

EXAMPLE 9

Using the apparatus described in the previous examples, 207 g of a propylene-propane mixture containing 88.5% of propylene, and 29 g of ethylene are employed to obtain a propylene-ethylene ratio of 4.35:1. The reservoir is heated under shaking to 200°C. 0.02 moles of trihexyl aluminum dissolved in 450 cc heptane are introduced into the polymerization autoclave. The gaseous monomers are then added, up to a pressure of 2 atm. Thereafter a solution of 0.002 moles $VOCl_3$ in 50 cc heptane is injected and, after a few minutes, the autoclave is set in a vertical position and the feeding and continuous venting of the gases is started, keeping a constant pressure of 6 atm. at temperatures between 20° and 25°C. After about 10 minutes, 100 liters of gas are collected at the exit of the autoclave, and the run is stopped by injecting methanol. Proceeding as described in the previous examples, 26.3 of a copolymer consisting of a solid product similar in appearance to a non-vulcanized elastomer are isolated. Fractionation is carried out by extraction with hot solvents.

The acetone extract, corresponding to 7% of the total, is formed of oily products of low molecular weight. The infra-red spectrum shows that this fraction consists of ethylene-propylene copolymers.

The ether extract corresponding to 54% is a solid elastic product having an intrinsic viscosity of 2.0, corresponding to a molecular weight of 94,000. This fraction appears completely amorphous under the X-rays. From the shift of the maximum in the spectrum of the amorphous, a propylene content of about 50% is calculated. The infra-red spectrum shows that this fraction is a copolymer, with a propylene content of 64%.

The heptane extract, corresponding to 39.0% has an intrinsic viscosity of 4.75, corresponding to a molecular weight of about 348,000. This heptane extract, when examined under the X-rays, appears formed by more than 95% of an amorphous copolymer, containing approximately 33% propylene. A slight crystallinity is detectable, attributable to copolymer macromolecules very rich in ethylene. The infra-red spectrum of this fraction shows that it contains 33% propylene. FIG. 7 gives a stress-elongation curve determined on specimens obtained in the usual way from the heptane extract.

EXAMPLE 10

A solution of 0.03 moles trihexyl aluminum in 350 cc heptane, 62 g propylene and 11 g ethylene are introduced in a two liter autoclave previously filled with nitrogen. The molar ratio between propylene and ethylene is 3.72:1. Keeping the autoclave in motion, a solution of 0.003 moles of $VOCl_3$ in 50 cc heptane is injected at 20°C. The temperature rises in a few minutes to 30°C, while the pressure drops from 8.5 to 7 atm. 200 cc of methanol are then injected and, after a few minutes shaking, the autoclave is emptied and, after purification and drying as usual, 25 g of product are isolated (corresponding to a 33% conversion) which product is fractionated by extraction with hot solvents.

The acetone extract, corresponding to 7.4% of the total, consists of oily, low-molecular weight products which the infra-red spectrum shows to consists of ethylene-propylene copolymers.

The ether extract, corresponding to 38% is a solid product of intrinsic viscosity 1.16, corresponding to a molecular weight of about 39,800. It has the appearance of a non-vulcanized elastomer. The X-rays examination shows that this fraction is an amorphous copolymer. The maximum of the diffraction intensity is clearly shafted as compared to the corresponding maximum of pure amorphous polypropylene. From this shift one can estimate a propylene content of about 50%. The infra-red spectrum shows bands attributable to sequences of various lengths of methylene groups, and a propylene content of approximately 67%.

The heptane extract, corresponding to 52.5% is a solid product with an intrinsic viscosity of 3.90, corresponding to a molecular weight of about 260,000. Under the X-rays, this extract appears as formed by approximately 92% of an amorphous copolymer, containing about 15% propylene. The presence of certain bands indicates a slight crystallinity (approximately 8%). These bands are shifted in respect to the bands of pure crystalline polyethylene.

The extraction with heptane leaves no residue. The infra-red spectrum of the heptane extract shows a propylene content of 20%.

EXAMPLE 11

A solution of 0.02 moles trihexyl aluminum in 300 ml n-heptane is introduced into a vertical autoclave of 2 liter capacity, having an internal diameter of 55 mm and filled with nitrogen. The solution is then saturated under a pressure of 6 atm with an ethylene-propylene mixture containing by volume 84% propylene and 16% ethylene. After injecting in the autoclave a solution of vanadium oxychloride in 50 ml n-heptane, the propylene-ethylene mixture is bubbled through the catalyst suspension at the rate of 250 l/hr while maintaining a constant pressure of 6 atm, and a temperature of 25°–35°C. After about 15 minutes the reaction product is discharged and purified as described in previous examples. By using in different runs different amounts of $VOCl_3$, so as to have different ratios between the aluminum and vanadium compounds in the catalyst, it is found that the molecular weight of the copolymer obtained increases with an increase in said ratio, as indicated in the following table:

| $\frac{Al(C_6H_{13})_3}{VOCl_3}$ (Molar ratio) | copolymer Intrinsic viscosity (in tetralin at 135°C) | Molecular Weight |
| --- | --- | --- |
| 2.5 | 1.98 | 91,000 |
| 5 | 2.65 | 143,000 |
| 10 | 3.35 | 204,000 |
| 40 | 4.30 | 300,000 |

EXAMPLE 12

A solution of 0.02 mol trihexyl aluminum in 450 ml n-heptane is introduced, in a nitrogen atmosphere, into the autoclave of Example 8, and is saturated with a propylene-ethylene mixture under a pressure of 6 atm. A solution of 0.0025 mol $VOCl_3$ in 50 ml n-heptane is then added and the gas mixture is bubbled through at the rate of 250 l/hr. under 6 atm and at 20°–30°C, for about 20 minutes. In one run, the propylene/ethylene molar ratio in the gas phase was 9.27; ina second run said ratio was 2.95. The reaction product of each run was discharged, purified and fractionated as described, and the fractions were examined at the X-ray and at the I.R. The examinations confirm that the products are true copolymers.

EXAMPLE 13

A propylene-ethylene mixture is prepared starting from 99.6% propylene obtained from isopropyl alcohol, and 98% of $C^{14}$ labeled ethylene. This was prepared by hydrogenation of $C^{14}$ labeled acetylene obtained, in turn, from $C^{14}$ labeled barium carbide. The ethylene specific activity, measured with an effective geometry of 30% on a sample of polyethylene, with a Geiger Mullar counter having a mica window of 1.8 $mg/cm^2$, is 1766 counts per minute. The analysis of the ethylene-propylene mixture is carried out by measuring the specific activity of barium carbonate obtained by absorbing in barium hydroxide solution the carbon dioxide deriving from the complete combustion of the mixture in a copper oxide furnace at 850°–900°C. The results of this analysis were confirmed by mass-spectrography.

The polymerization apparatus consists of a cylindrical glass vessel of 1000 ml capacity, 65 mm inside diameter, fitted with a paddle stirrer, a reflux condenser, a dipping inlet tube with fitted glass end, and a gas outlet. 300 ml n-heptane are introduced in the vessel and saturated with a stream of the two monomers. The catalyst is prepared separately, in a 100 ml glass flask in a nitrogen atmosphere by adding dropwise, a solution of 0.003 mol $VOCl_3$ in 20 ml n-heptane under stirring, at 20°C., to a solution of 0.009 mol trihexyl aluminum in 30 ml n-heptane. After 30 minutes the mixture is introduced in the polymerization vessel.

A mixture of the two monomers, containing 80% by volume of propylene is then fed in for 10 minutes at the rate of 80 l/hr keeping the temperature between 25° and 30°C. After this time, the reaction is stopped by adding methanol.

The reaction product is purified by treatment with aqueous hydrochloric acid, separation of the two phases, and washing with water, followed by complete coagulation with a methanol-acetone mixture.

After filtration and vacuum drying, 4.7 g of a solid, white, elastic product are obtained.

From the specific activity measured with a Geiger Muller counter as above, on a plate prepared from the polymer, a content in ethylene of 31.9% by weight is calculated, using the formula:

$$\frac{\text{Ethylene specific gravity}}{\text{Copolymer specific activity}} = \frac{a+b}{a}$$

where $a$ is the ethylene, and $b$ the propylene percentage in the copolymer.

47.75% of the copolymerizate is extractable with boiling ether, while extraction with boiling n-heptane leaves no residue.

EXAMPLE 14

The polymerization is carried out in the apparatus shown in FIG. 8.

Referring to FIG. 8, ethylene and a propylene-propane mixture containing 93% propylene are fed continuously from reservoirs 1 and 2 under a pressure of 5 atm, the flow rates being adjusted as to have a propylene-ethylene molar ratio in the feed of 3.8:1. The gases are mixed in mixing vessel 3, and fed to reactor 4, which is a vertical autoclave of 3600 ml capacity, internal diameter 100 mm, fitted with a paddle stirrer 5 and with an oil jacket 6. A benzene suspension of the catalyst, prepared by mixing a 2.5% by weight solution of tri-isobutyl aluminum in benzene with a 0.5% solution of vanadium oxychloride also in benzene is simultaneously continuously fed into reactor 4 at a rate of 2.0 liters/hour. These solutions of the catalyst components are stored separately, blanketed with nitrogen, in reservoirs 7 and 8 respectively, and are mixed in the feeding pump, designated P in FIG. 8 of the drawing, before being pumped into the reactor.

The solution of the copolymerizate formed in the reactor 4 is discharged continuously into collection vessel 9 through an overflow near the top of the autoclave. The gas flow at the outlet is kept in the neighborhood of 500 l/hr. The temperature in the autoclave is kept around 40°C. The copolymerizate is purified by treating the benzene solution repeatedly with 10% nitric acid, washing it repeatedly with water, separating the two phases and finally removing the solvent by steam distillation. In a 10 hour run under the above outlined conditions, 1200 g of a propylene-ethylene copolymerizate are obtained, with an ash content of 0.06%, and a molecular weight of about 160,000. The I.R. spectrum indicates a content of 59% propylene by weight, and the presence of sequences of methylene groups. The copolymerizate is partially (40%) extractable with boiling ether, while the extraction with boiling n-heptane leaves no residue. X-ray examination shows that the obtained product is an amorphous ethylene-propylene copolymerizate.

EXAMPLE 15

The reaction apparatus consists of a large tube, having a capacity of 750 ml and a diameter of 5.5 cm, provided with a tube for feeding and discharging the gases, a mechanical agitator and a thermometer sheath. The tube for introducing the gases reaches the bottom of the vessel and ends with a porous diaphragm (diameter 3.5 cm). The apparatus is kept at a constant temperature of −20°C.

300 ml of anhydrous heptane are introduced and the solvent is then saturated at −20°C by passing through it a mixture containing propylene and ethylene in the molar ratio of 4:1, with a flow rate of 200 Nl/h. In the meantime, the catalyst is prepared at −20°C by mixing a solution of 7 millimols of diethyl aluminum monochloride in 20 cc of anhydrous toluene with a solution of 1.4 millimols of vanadium triacetylacetonate in 20 ml of toluene.

The activity of the catalyst thus prepared remains practically unaltered with time, as is apparent from table III which shows the results of some copolymerization runs differing only in the time which elapsed between the preparation of the catalyst and its introduction into the reactor.

In each run, the mixture of the two monomers was fed with a flow rate of 400 Nl/h for 6 minutes.

TABLE III

| Run | Ageing time at −20°C; minutes elapsed between the preparation and the use of the catalyst | g of polymer obtained within in 6 minutes | $C_2H_4$ mols % | g of copolymer per hour and per liter of solution referred to 1 g/l. of $VAc_3$ and 1 mol $C_2H_4+C_3H_6$ dissolved per liter of solution |
|---|---|---|---|---|
| 1 | 1 | 9.6 | 37.2 | 91 |
| 2 | 5 | 8.9 | 39.7 | 85 |
| 3 | 15 | 8.6 | 36.0 | 81.5 |

The copolymerizates thus obtained were purified by successive treatments of their heptane solution with aqueous hydrochloric acid, washing with water, and complete coagulation with acetone and methanol. They were found to be amorphous upon X-ray examination, were more than 95% extractable with boiling ethyl ether, and left no residue on extraction with boiling n-hexane.

Table IV shows the results obtained in three runs using the same catalyst, but prepared at 25°C, instead of at −20°C, and a copolymerization temperature of 25°C, instead of −20°C.

TABLE IV

| Ageing time at 25°C; minutes elapsing between the preparation and use of the catalyst | g of polymers obtained within 19 minutes | $C_2H_4$ mols % | g of copolymer produced per hour and per liter of solution referred to 1 g/l. of $VAc_3$ and 1 mol of $C_2H_4+C_3H_6$ dissolved per 1 l. of solution |
|---|---|---|---|
| 1 | 3.8 | 50.2 | 41.5 |
| 5 | 2.2 | 53.5 | 24 |
| 15 | 1.0 | 53.0 | 10.9 |

EXAMPLE 15-A

The process is carried out under the conditions of Example 15, but instead of vanadium triacetylacetonate, the same amount of vanadyl diacetylacetonate is used in the preparation of the catalyst. The results obtained are reported in the following table:

TABLE V

| Run | Time elapsing between the preparation and the use of the catalyst (in minutes) | g of copolymer obtained within 6 minutes | $C_2H_4$ mols % | g of copolymer per hour and per liter of solution referred to 1 g/l. of $VOAc_3$ and 1 mol of $C_2H_4+C_3H_6$ dissolved per liter of solution |
|---|---|---|---|---|
| 4 | 1 | 5.6 | 50.7 | 107 |
| 5 | 5 | 5.0 | 50.6 | 95.5 |
| 6 | 15 | 4.9 | 47.5 | 93.5 |

By operating under the conditions of run 5, but preparing the catalyst and carrying out the polymerization for 18 minutes at 25°C instead of −20°C, 3.3 of ethylene-propylene copolymer are obtained; an average rate of $$48.8 \frac{g \text{ copolymer} \times \text{liter}}{g \text{ VOAc}_2 \times h \times \text{mols}(C_2H_4 + C_3H_6)}$$

is calculated therefrom.

EXAMPLE 16

About 6000 cc of liquid propylene are introduced into a 7000 cc stainless steel autoclave at −10°C and provided with a mechanical stirrer. The propylene is saturated with ethylene, the autoclave being kept under a pressure of 3.8 atm.

The catalyst is introduced into the autoclave by feeding continuously a heptane solution of diethyl aluminum monochloride and, also continuously a toluene solution of vanadium triacetylacetonate, so as to maintain in the autoclave an $Al(C_2H_5)_2 Cl/VAc_3$ molar ratio comprised between 5 and 8. In total, 0.37 g of vanadium triacetylacetonate are introduced into the autoclave.

After 2 hours, the autoclave is discharged, the gases are released and the product obtained is dried under reduced pressure.

750 g of amorphous copolymerizate, corresponding to a yield of 2000 g per g of vanadium triacetylacetonate, are obtained.

The copolymerizate thus produced has an intrinsic viscosity, determined in tetrahydronaphthalene at 135°C, of 4.0 and is more than 90% extractable with boiling ether. A sample of the copolymerizate, after dispersion on an inert support, was fractionated by elution with mixtures of solvents having increasing dissolving capacity.

The fractionation data and the intrinsic viscosity values of the single fractions are shown in the following Table:

TABLE VI

| % | [η] |
|---|---|
| 9.8 | 3.20 |
| 11.0 | 3.30 |
| 11.6 | 3.51 |
| 12.4 | 3.97 |
| 10.0 | 4.09 |
| 7.8 | 4.47 |
| 11.6 | 4.47 |
| 6.1 | 4.53 |
| 7.2 | 4.53 |
| 12.5 | 4.52 |

EXAMPLE 17

Into the autoclave used in Example 16, cooled to −10°C, about 4000 cc of liquid propylene are introduced and saturated with radioactive ethylene, the autoclave being kept under a pressure of 3.8 atm. Five cc of a solution containing 6.9 g of diethyl aluminum monochloride per 100 cc of n-heptane and 5 cc of a solution containing 2.5 g of vanadium triacetylacetonate per 100 cc of toluene are then introduced.

After 15 minutes and 30 minutes, additional amounts of the catalyst corresponding each time to one-half of the initially added amount, are introduced. After 45 minutes, the autoclave is discharged and 315 g of ethylene-propylene copolymerizate, containing 43.5% by mols of ethylene are isolated. The yield is 1250 g of copolymer per g of vanadium triacetylacetonate.

The product thus obtained has an intrinsic viscosity, determined in tetrahydronaphthalene at 135°C of 5.3 × 100 cc/g, and is found to be more than 90% extractable with boiling ether.

EXAMPLE 18

The reaction apparatus consists of a large tube having a capacity of 750 ml and a diameter of 5.5 cm, provided with a tube for feeding and discharging the gases, a mechanical agitator and a thermometer sheath. The tube for introducing the gases reaches the bottom of the vessel and ends with a porous diaphragm (diameter 3.5 cm). The apparatus is de-aerated and kept at the constant temperature of −20°C. 350 cc of n-heptane are introduced under nitrogen; the solvent is then saturated by passing through it a gaseous propylene/ethylene mixture having a molar ratio of 4:1 with a flow rate of 200 Nl/h.

The catalyst is prepared at −20°C by mixing a solution of 1.4 millimols of vanadium triacetylacetonate in 25 cc of toluene with a solution of 21 millimols of diethyl aluminum monofluoride in 25 cc of toluene.

Five minutes after its preparation, the catalyst is introduced into the reaction apparatus by siphoning under nitrogen.

The mixture of the two monomers is fed continuously with a flow rate of 600 Nl/h for 6 minutes, while agitating the mass.

The run is then stopped by introducing 50 cc methanol, and the copolymerizate obtained is purified by successive treatments with aqueous hydrochloric acid. It is finally coagulated with acetone and methanol.

14 g of ethylene propylene copolymerizate, containing 40% by moles of ethylene as determined radiochemically, are thus obtained.

The average copolymerization rate corresponds to $$133 \frac{g \text{ copolymer} \times \text{liter}}{g \text{ VAc}_3 \times h \times \text{mols}(C_2H_4 + C_3H_6)}$$

By operating under the same conditions, but carrying out both the polymerization and the preparation of the catalyst at the temperature of 25°C, instead of −20°C, 1.2 g of ethylene-propylene copolymerizate are obtained within 18 minutes, i.e., with an average copolymerization rate of $$13.2 \frac{g/\text{copolymer} \times \text{liter}}{g \text{ VAc}_3 \times \text{hours} \times \text{moles}(C_2H_4 + C_3H_6)}$$

EXAMPLE 19

Reaction apparatus as described in Example 15 is used.

350 cc of anhydrous n-heptane are introduced, and this solvent is then saturated at the temperature of −20°C by passing through it a mixture containing propylene and ethylene in the molar ratio of 4:1, with a flow rate of 200 Nl/h.

Meanwhile, the catalyst is prepared at the temperature of −20°C by mixing a solution of 14 millimols mono-ethyl aluminum dichloride, in 20 cc anhydrous toluene with a solution of 2.8 millimols vanadium triacetylacetonate in 20 cc toluene.

The catalyst thus prepared is introduced into the reaction apparatus about 1 minute after its preparation. The mixture of the 2 monomers is continuously fed for 10 minutes with a flow-rate of 300 Nl/h.

The run is then stopped by introducing 50 cc of methanol, and the copolymerizate obtained, dissolved in n-heptane, is purified by repeated treatments with aqueous hydrochloric acid. The heptane phase is shaken repeatedly with water and the copolymer is then completely coagulated with acetone and methanol.

6.5 g of ethylene-propylene copolymerizate, a white solid having the appearance of a non-vulcanized elastomer, are thus obtained.

This product is found to be amorphous by X-ray examination, contains about 50% by mols of ethylene, determined by infrared analysis, and presents an intrinsic viscosity, determined in tetrahydronaphthalene at 135°C of 3.5.

By fractionation of the copolymerizate by extraction with boiling solvents, using, successively, acetone, ether and n-hexane, an acetone extract corresponding to 2% of the total product is obtained. There is no residue after extraction with boiling n-hexane.

EXAMPLE 20

The copolymerization is carried out as described in Example 9, but vanadyl diacetylacetonate is used in the preparation of the catalyst instead of vanadium triacetylacetonate.

The catalyst is prepared in the absence of the monomers, by mixing a solution of 14 millimols mono-ethyl aluminum dichloride in 25 cc anhydrous toluene with a solution of 2.8 millimols vanadyl diacetylacetonate in 25 cc toluene.

About 1 minute after its preparation, the catalyst is introduced into the reaction apparatus.

After 10 minutes, 7.2 g of solid ethylene-propylene copolymerizate having the appearance of a non-vulcanized elastomer, are obtained. The Copolymerizate is amorphous by X-ray examination and is completely extractable with boiling n-hexane. The extraction with boiling acetone dissolves 2.5% of the total product.

EXAMPLE 21

Into the reaction apparatus described in Example 18, kept at −20°C, there are introduced 350 cc anhydrous n-heptane through which a gaseous propylene-ethylene mixture (molar ratio propylene to ethylene 4:1) is circulated at the rate of 200 liters per hour.

The catalyst is prepared at −20°C by mixing a solution of 10.5 millimols aluminum diethyl monochloride in 20 cc anhydrous toluene with a solution of 2.1 millimols vanadyl monochloro diethylate (the diethylester of the monochloride of orthovanadic acid) in 20 cc anhydrous toluene.

The catalyst is kept 15 minutes at −20°C and then injected into the autoclave under nitrogen pressure.

The monomer mixture is now circulated at the rate of 400 liters per hour. After 10 minutes the reaction is stopped by introducing 20cc methanol.

The product is purified and isolated as described.

7.6 g of copolymerizate are obtained, which is amorphous at the X-rays, has the aspect of unvulcanized rubber and is completely extractable with boiling n-hexane.

The average copolymerization rate is of $$\frac{54 \text{ g copolymerizate} \times \text{liter}}{\text{g VO(OC}_2\text{H}_5)_2\text{Cl} \times \text{h} \times \text{mols} (C_2H_4 + C_3H_6)}$$

If the catalyst is prepared and used at 25°C instead of at −20°C 1.5 g copolymerizate are obtained in 10 minutes, which corresponds to a rate of $$\frac{36.4 \text{ g copolymerizate} \times \text{liter}}{\text{g VO(OC}_2\text{H}_5)_2 \text{Cl} \times \text{h} \times \text{mols}(C_2H_4 + C_3H_6)}$$

EXAMPLE 22

The method of the preceding Example is followed, using a catalyst prepared at −20°C by admixture of a solution of 1.4 millimols vanadyl monochloro-diacetylacetonate in 20 cc anhydrous toluene with a solution of 7.0 millimols aluminum diethyl monochloride in 20 cc anhydrous toluene.

The catalyst is kept for 5 minutes and at −20°C prior to contact with the monomer mixture, which contains propylene and ethylene in a 4:1 molar ratio and is circulated at the rate of 400 liters per hour. The run is continued for 5 minutes, then polymerization is stopped by addition of 20 cc methanol.

9 g of a completely amorphous copolymerizate, completely extractable with boiling n-hexane are obtained. The copolymerization rate is $$\frac{121 \text{ g copolymerizate} \times \text{liter}}{\text{g VOAc}_2 \text{ Cl} \times \text{h} \times \text{mols } (C_2H_4 + C_3H_6)}$$

EXAMPLE 23

The method of Example 21 is followed, except that a monomer mixture having a 2:1 propylene to ethylene molar ratio is used.

The catalyst is prepared at −20°C from a solution of 0.7 millimols vanadium triacetylacetonate and 3.5 millimols aluminum diethyl monochloride, each dissolved in 20 cc anhydrous toluene.

The catalyst is kept for 5 minutes at −20°C before contacting it with the monomer mixture, which is then circulated at the rate of 400 liters per hour.

The run lasts 3 minutes. There are obtained, after purification as described in Example 15, 5.3 g amorphous copolymerizate completely extractable with boiling n-heptane. The ethylene content, measured radiochemically, is 58.8% by mols.

The copolymerization rate is $$200 \text{ g } \frac{\text{copolymerizate} \times \text{liter}}{\text{g VAC}_3 \times \text{h} \times \text{mols } (C_2H_4 + C_3H_6)}$$

If the catalyst is prepared and used at 25°C, in 10 minutes 1.2 g copolymerizate are obtained, which corresponds to a rate of $$47 \text{ g } \frac{\text{copolymerizate} \times \text{liter}}{\text{g VAC}_3 \times \text{h} \times \text{mols}(C_2H_4 + C_3H_6)}$$

EXAMPLE 24

The reaction apparatus consists of a 750 cc glass test tube having a diameter of 5.5 cm, provided with tubes for introducing and discharging the gases, a mechanical agitator and a thermometer sheath. The tube for introducing the gases reaches the bottom of the reaction apparatus and ends with a porous diaphragm of the G.3 type having a diameter of 3.5 cm.

The reaction apparatus is immersed in a bath kept at the constant temperature of 25°C.

370 cc anhydrous heptane are introduced under nitrogen into the previously de-aerated apparatus and the solvent is then saturated with a mixture of propylene and ethylene in the molar ratio of 2:1, introduced with a flow rate of 200 l/h. Meanwhile a solution of 0.0009 mols trihexyl aluminum in 20 cc n-heptane is introduced into a 50 cc flask provided with a magnetic stirrer and kept at the constant temperature of 25°C under nitrogen; a solution of 0.0003 mols $VCl_4$ in 10 cc n-heptane is then added dropwise. After 10 minutes the catalyst thus prepared is introduced by siphoning under nitrogen into the reaction apparatus and the mixture of the two monomers is continuously fed and discharged with a flow rate of 150 l/h. It is noted that during this time the solution becomes more and more viscous.

The polymerization is then stopped by introducing 50 cc of methanol and the copolymer obtained, dissolved in n-heptane, is purified by successive treatements with aqueous hydrochloric acid. The heptane phase is then agitated with water and the polymer is finally completely coagulated with acetone and methanol.

8 g of ethylene-propylene copolymer containing 50% ethylene by mols, a white solid amorphous by X-ray examination, are thus obtained. This product gives no residue by extraction with boiling n-heptane.

EXAMPLES 25–31

By operating as described in the preceding Example, various polymerization runs are carried out by circulating gaseous mixtures containing propylene and ethylene in various molar ratios.

In these runs a radioactive ethylene is used whose specific activity is previously determined.

The composition of the copolymer is determined by radiochemical analysis.

In the following Table are reported the results of seven polymerization runs carried out with a trihexyl aluminum/$VCl_4$ molar ratio of 3. The polymerization time is 10 minutes.

TABLE

| Example Number | $C_3H_6/C_2H_4$ molar ratio in the feeding mixture | Catalyst concentration g of $Al(C_6H_{13})_3$ per liter | Copolymer g | % by mols of ethylene in the copolymers |
|---|---|---|---|---|
| 25 | 20.50 | 0.0045 | 4 | 10.5 |
| 26 | 5.10 | 0.00225 | 4.9 | 30.5 |
| 27 | 4.06 | 0.0045 | 9.2 | 34.5 |
| 28 | 2.12 | 0.00225 | 8.0 | 50.5 |
| 29 | 1.27 | 0.00112 | 3.5 | 50.5 |
| 30 | 1.01 | 0.00112 | 3.3 | 64.3 |
| 31 | 0.98 | 0.00112 | 4.2 | 66.0 |

All products are amorphous by X-ray examination and give no residue by extraction with boiling n-heptane.

EXAMPLE 32

The method of Example 24 is used under the same temperature conditions and with an ethylene-propylene mixture in a molar ratio of 2:1 which is circulated at the rate of 200 l/h. The ethylene employed is radioactive.

The catalyst is prepared at 25°C in a nitrogen atmosphere, by admixing a solution of 3 millimols aluminum diethyl monochloride in 20 cc anhydrous heptane with a solution of 0.6 millimols vanadium tetrachloride in 20 cc anhydrous heptane. The catalyst is kept at 25°C for 5 minutes and then siphoned into the reaction apparatus, under nitrogen.

The gaseous mixture is fed now with a rate of 400 liters per hour. The viscosity of the mass increases rapidly. After 3 minutes from the introduction of the catalyst, the reaction is stopped by adding 20 cc methanol.

The mass is diluted with benzene and purified by repeated treatments with hydrochloric acid and water. Then the copolymer is coagulated with acetone and methanol. After a vacuum drying, 4.5 g of a white, solid product are obtained, which has the aspect of unvulcanized rubber.

The product is completely amorphous at the X-ray examination and completely soluble in boiling n-heptane. The radiochemical analysis shows that it contains 40% ethylene by weight. The infrared spectrum shows the presence of methyl groups and of methylene sequences. The intrinsic viscosity in tetralin at 135°C, is 2.01.

EXAMPLE 33

The method of Example 24 is used: the temperature is kept at −20°C. A gas mixture of propylene and radioactive ethylene in a molar ratio of 2:1 is circulated at the rate of 200 l/h. The catalyst is prepared at −20°C in nitrogen, by admixing a solution of 1 millimol aluminum diethyl monochloride in 20 cc anhydrous heptane with a solution of 0.2 millimols vanadium tetrachloride in 20 cc anhydrous heptane. The catalyst is kept at −20°C for 5 minutes and then siphoned in the reaction apparatus, under nitrogen.

The gas mixture is now circulated at the rate of 400 liters per hours, and the viscosity of the reaction mass increases rapidly. After 3 minutes from the introduction of the catalyst the reaction is stopped by adding 20 cc methanol. The product is purified and isolated as described in the preceding example. 12 g of solid polymer is obtained, which is amorphous at the X-rays, completely extractable with boiling n-heptane and has the aspect of unvulcanized rubber. The radiochemical analysis reveals a content of 39.5% ethylene by weight. The infrared spectrum shows the bands typical for amorphous copolymers of this type. The intrinsic viscosity, in tetralin at 135°C, is 1.38.

EXAMPLE 34

The run is carried out as in Example 32, however with a propylene to ethylene molar ratio of 4:1, while the catalyst is prepared by admixing at 25°C a solution of 7 millimols aluminum diethyl monochloride in 20 cc anhydrous toluene with a solution of 1.4 millimols ethyl orthovanadate in 20 ml anhydrous toluene, and is kept for 1 minute at 25°C prior to the introduction into the reaction apparatus.

The run lasts 10 minutes and the product obtained, after purification and separation as in the preceding Examples, weighs 3.2 g. Its characteristics are the same as for the product obtained according to Example 24. The radiochemical analysis shows an ethylene content of 37% by weight.

EXAMPLE 35

The method of Example 34 is followed: however, the catalyst is prepared from 14 millimols triethyl aluminum in 20 ml anhydrous toluene and 2.8 millimols vanadyl dichloro monoethylate (the ethyl ester of orthovanadic acid dichloride) in 20 ml anhydrous toluene. The run lasts 12 minutes. The purified and dried product weighs 4 g and contains 41% ethylene by weight, by radiochemical analysis. Its characteristics are otherwise similar to the ones of the product of Example 34.

In the accompanying drawings:

FIG. 1 comprises the stress-elongation curve obtained by subjecting to tensile test a plate molded from the mechanical mixture obtained by coprecipitating polyethylene and linear amorphous polypropylene in a polyethylene/polypropylene ratio of 3:1;

FIG. 2 comprises the stress elongation curve obtained by subjecting to tensile test plates molded from the mechanical mixture obtained by coprecipitating polyethylene and linear amorphous polypropylene in a polyethylene/polypropylene ratio of 1:1;

FIG. 3 comprises the curve obtained for specimens die-molded at 185°C from a polymerizate obtained by polymerizing a mixture of 67 moles % of propylene and 33 moles % of ethylene, at 60°C, and in contact with a catalyst prepared from $TiCl_4$ and triethyl aluminum;

FIGS. 4, 5, 6 and 7 comprise stress-elongation curves obtained by testing plates molded from pure ethylene-propylene copolymers of the invention;

FIG. 8 is a diagrammatic showing of apparatus that can be used for carrying out the present copolymerization method;

FIGS. 9, 10 and 11 were discussed above.

As is apparent from FIGS. 1 and 2, comprising the curves characteristic of the mechanical mixture, the two mixed homopolymers have poor compatibility. The plates obtained by molding the mixtures at 150°C are not homogeneous.

The stress-elongation curves for the mixtures (FIGS. 1 and 2) show a yield point which is absent from the curves for the pure copolymers (FIGS. 4–7), a high initial modulus due to the presence of a linear polyethylene which is not present in the heptane-extracted fraction of the copolymerizate, and a low elongation at break resulting from separation of the homopolymers due to the different extent of deformation of the respective homopolymers of the heterogeneous mixtures.

In contrast, analysis of the results of the mechanical tests carried out on our copolymerizates consisting essentially of the amorphous, true copolymers (FIGS. 4–7) show that the latter products have the low initial modulus and the high elastic elongations chracteristic of amorphous linear substances of high molecular weight having a low second order transition temperature.

Changes and variations may be made in carrying out the invention without departing from the spirit thereof. Therefore, we intend to include in the scope of the appended claims all such modifications as will be obvious to those skilled in the art from the description and illustrative working examples given herein.

What is claimed is:

1. A process of preparing amorphous, elastomeric, linear copolymers of ethylene and propylene containing from 20% to about 70% by weight of ethylene in the macromolecule, characterized in that the infra-red spectra thereof show, in the 13 to 14 micron region, absorptions at 13.6 microns and at 13.85 microns, and show, in the 10 to 11 micron region, absorptions at 10.67 microns and at 10.3 microns, and further characterized in being substantially free of homopolymers, and in having a molecular weight above 20,000, as determined by viscosity measurements in tetralin at 135°C. and calculated by the formula $$[\eta] = 1.18 \times 10^{-3} \times M^{0.65},$$

in which $[\eta]$ represents intrinsic viscosity and M represents molecular weight, which process comprises (a) contacting a mixture of monomers to be polymerized with a liquid phase catalyst essentially free of microcrystalline precipitates, said catalyst being prepared by mixing an alkyl aluminum compound in which the alkyl groups contain from 2 to 6 carbon atoms with a hydrocarbon-soluble vanadium compound, at least one of the catalyst-forming components containing halogen, (b) maintaining a molar ratio of propylene to ethylene in the gas phase of said monomer mixture of at least 1 to 1 and a molar ratio of at least 4 to 1 in the liquid phase in contact with said catalyst, and (c) recovering said copolymers from said liquid phase.

2. A process of preparing amorphous, elastomeric, linear copolymers of ethylene and propylene containing from 20 to about 70% by weight of ethylene in the macromolecule, characterized in that the infra-red spectra thereof show, in the 13 to 14 micron region, absorptions at 13.6 microns and at 13.85 microns, and show, in the 10 to 11 micron region, absorptions at 10.67 microns and at 10.3 microns, and further characterized in being substantially free of homopolymers, and in having a molecular weight above 20,000, as determined by viscosity measurements in tetralin at 135°C. and calculated by the formula $$[\eta] = 1.18 \times 10^{-3} \times M^{0.65},$$

in which $[\eta]$ represents intrinsic viscosity and M represents molecular weight, which process comprises (a) contacting a mixture of monomers to be polymerized with a liquid phase catalyst essentially free of microcrystalline precipitates, said catalyst being prepared by mixing, in the presence of the monomers, an alkyl aluminum compound in which the alkyl groups contain from 2 to 6 carbon atoms with a hydrocarbon-soluble vanadium compound, at least one of the catalyst-forming components containing halogen, (b) maintaining a molar ratio of propylene to ethylene in the gas phase of said monomer mixture of at least 1 to 1 and a molar ratio of at least 4 to 1 in the liquid phase in contact with said catalyst, and (c) recovering said copolymers from said liquid phase.

3. A process of preparing amorphous, elastomeric, linear copolymers of ethylene and propylene containing from 20 to about 70% by weight of ethylene in the macromolecule, characterized in that the infra-red spectra thereof show, in the 13 to 14 micron region, absorptions at 13.6 microns and at 13.85 microns, and show, in the 10 to 11 micron region, absorptions at 10.67 microns and at 10.3 microns, and further characterized in being substantially free of homopolymers, and in having a molecular weight above 20,000, as determined by viscosity measurements in tetralin at 135°C. and calculated by the formula $$[\eta] = 1.18 \times 10^{-3} \times M^{0.65},$$

in which $[\eta]$ represents intrinsic viscosity and M represents molecular weight, which process comprises (a) contacting a mixture of monomers to be polymerized with a liquid phase catalyst essentially free of microcrystalline precipitates, said catalyst being prepared by mixing, at a temperature not higher than 0°C., an alkyl aluminum compound in which the alkyl groups contain from 2 to 6 carbon atoms with a hydrocarbon-soluble vanadium compound, at least one of the catalyst-forming components containing halogen, (b) maintaining a molar ratio of propylene to ethylene in the gas phase of said monomer mixture of at least 1 to 1 and a molar ratio of at least 4 to 1 in the liquid phase in contact with said catalyst, and (c) recovering said copolymers from said liquid phase.

4. A process of preparing amorphous, elastomeric, linear copolymers of ethylene and propylene containing from 20 to about 70% by weight of ethylene in the macromolecule, characterized in that the infra-red spectra thereof show, in the 13 to 14 micron region, absorptions at 13.6 microns and at 13.85 microns, and show, in the 10 to 11 micron region, absorptions at 10.67 microns and at 10.3 microns, and further characterized in being substantially free of homopolymers, and in having a molecular weight above 20,000, as determined by viscosity measurements in tetralin at 135°C. and calculated by the formula $$[\eta] = 1.18 \times 10^{-3} \times M^{0.65},$$

in which $[\eta]$ represents intrinsic viscosity and M represents molecular weight, which process comprises (a) contacting a mixture of monomers to be polymerized with a liquid phase catalyst essentially free of microcrystalline precipitates, said catalyst being prepared by mixing an alkyl aluminum compound in which the alkyl groups contain from 2 to 6 carbon atoms with a hydrocarbon-soluble vanadium compound, at least one of the catalyst-forming components containing halogen, said catalyst being held at a temperature no higher than about 0°C. until it is contacted with the mixture of monomers, (b) maintaining a molar ratio of propylene to ethylene in the gas phase of said monomer mixture of at least 1 to 1 and a molar ratio of at least 4 to 1 in the liquid phase in contact with said catalyst, and (c) recovering said copolymers from said liquid phase.

5. The process according to claim 1, characterized in that the catalyst consists essentially of the product obtained by mixing the alkyl aluminum compound with a hydrocarbon-soluble vanadium halide.

6. The process according to claim 1, characterized in that the catalyst consists essentially of the product obtained by mixing the alkyl aluminum compound with a hydrocarbon-soluble vanadium oxyhalide.

7. The process according to claim 1, characterized in that the catalyst consists essentially of the product obtained by mixing an alkyl aluminum compound with vanadium tetrachloride.

8. The process according to claim 1, characterized in that the copolymerization is carried out continuously by feeding the catalyst-forming components periodically to the copolymerizing system while maintaining constant the ratio between the concentration of the monomers in the gas phase.

9. The process according to claim 1, characterized in that the copolymerization is carried out continuously by feeding the catalyst-forming components, in the predetermined molar ratio, continuously to the copolymerization system.

10. The process according to claim 1, characterized in that a mixture of propylene and ethylene is contacted with a catalyst prepared by mixing trihexyl aluminum with a hydrocarbon-soluble vanadium chloride.

11. The process according to claim 1, characterized in that a mixture of propylene and ethylene is contacted with a catalyst prepared by mixing trihexyl aluminum with vanadium oxychloride.

12. The process according to claim 1, characterized in that a mixture of propylene and ethylene is contacted with a catalyst prepared by mixing aluminum tri-isobutyl with a hydrocarbon-soluble vanadium chloride.

13. The process according to claim 1, characterized in that a mixture of propylene and ethylene is contacted with a catalyst prepared by mixing aluminum tri-isobutyl with vanadium tetrachloride.

14. The process of claim 1, wherein said alkyl aluminum compound contains halogen.

15. The process of claim 1, wherein said vanadium compound contains halogen.

* * * * *

UNITED STATES PATENT OFFICE
CERTIFICATE OF CORRECTION

Page 1 of 3

Patent No. 3,957,743  Dated May 18, 1976

Inventor(s) Giulio NATTA et al

It is certified that error appears in the above-identified patent and that said Letters Patent are hereby corrected as shown below:

Col. 1, line 12, the word "patent" should be - - - parent - - -;

Col. 4, line 4, the word "polymerizate" should be - - - copolymerizate - - -;

Col. 4, line 24, Table I, the formula "Al($C_2H_5$)$_2$ ClV($C_5H_7O_2$)$_3$" should be - - - Al($C_2H_5$)$_2$ Cl-V ($C_5H_7O_2$)$_3$ - - -;

Col. 13, line 39 "2,000 capacity" should be - - - 2,000 cc capacity - - -;

Col. 14, line 63 "Fro" should be - - - From - - -;

Col. 15, material has been omitted from lines 6 - 9, which should read as follows:

- - - This fraction appears completely amorphous under the X-rays, and the maximum of the amorphous polymer spectrum is clearly shifted in respect to the maximum of the pure amorphous polypropylene.

From this shift one can calculate a propylene content of approximately 50% by weight.

The infra-red spectra clearly show the presence of bands between 13.4 and 13.8 $\mu$. From the intensity of the band due to the methyl groups, a propylene content of 60% by weight is calculated.

UNITED STATES PATENT OFFICE
CERTIFICATE OF CORRECTION

Patent No. 3,957,743  Dated May 18, 1976

Inventor(s) Giulio NATTA et al

It is certified that error appears in the above-identified patent and that said Letters Patent are hereby corrected as shown below:

The heptane extract, corresponding to 53.5% of the total, has an intrinsic viscosity of 4.05, corresponding to a molecular weight of approximately 274,000.

Figure 6 gives a stress-elongation graph obtained with specimens prepared from this fraction according to the ASTM test mentioned above. This fraction appears completely amorphous under the X-rays and the position of the maximum of the amorphous polymer spectrum indicates a propylene content of about 40%. - - -;

Col. 16, line 25, "26.3" should read - - - 26.3 g. - - -;

Col. 16, Example 9, the last paragraph of the example has been omitted. It reads

- - - The extraction with heptane leaves no residue. - - -;

Col. 18, line 55, the equation given should read

- - - $\dfrac{\text{Ethylene specific activity}}{\text{Copolymer specific activity}} = \dfrac{a + b}{a}$ Col. 23, line 2 of Example 20, "Example 9," should be - - - Example 19, - - -.

UNITED STATES PATENT AND TRADEMARK OFFICE
CERTIFICATE OF CORRECTION

PATENT NO. : 3,957,743
DATED : May 18, 1976
INVENTOR(S) : Giulio Natta, et al

It is certified that error appears in the above-identified patent and that said Letters Patent are hereby corrected as shown below:

Under Item [57], "Abstract", change "15 claims, no drawings" to -- 15 claims, Figures 1-11. --.

Either before or after item [63] in Column 1, the printed patent should show applicants' claim for the priority of Italian Patent Application No. 18,119 filed on December 23, 1955.

Signed and Sealed this

Twenty-fourth Day of August 1976

[SEAL]

Attest:

RUTH C. MASON
*Attesting Officer*

C. MARSHALL DANN
*Commissioner of Patents and Trademarks*